8746X
J. Brandon,
Horse Power,
Patented Apr. 8, 1835.
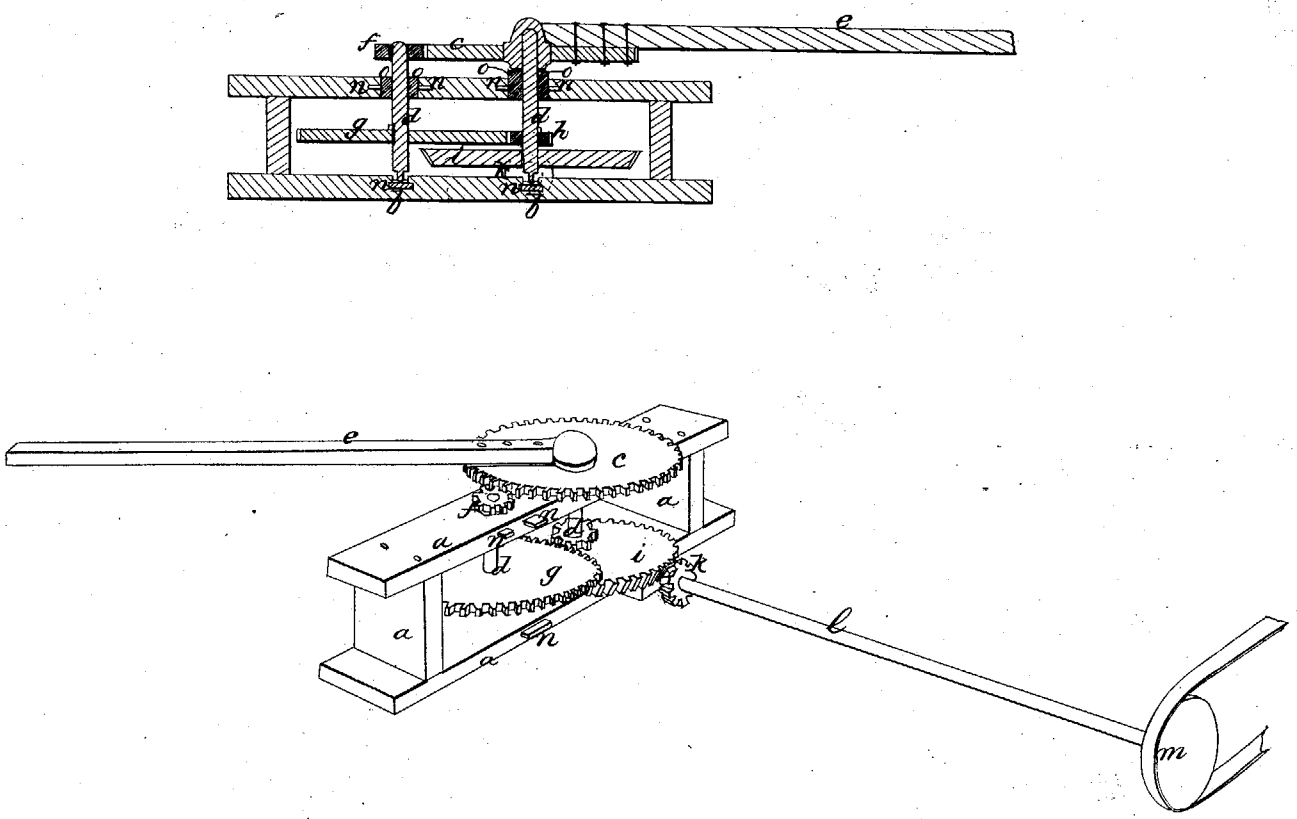
AM. PHOTO-LITHO. CO. N.Y. (OSBORNE'S PROCESS)

87467 Apl 8 1835

John Brandon, Williamsport Penn.

Letters Patent

Apr. 18, 183

The schedule referred to in these Letters Patent and making part of the same
containing a description in the words of the said John Brandon himself,
of his improvement in the Portable Horse power.

---

To all whom it may concern: Be it known that I John
Brandon of Williamsport in the County of Lycoming and State of Penn-
sylvania have invented certain improvements in the portable horse
power and I do hereby declare that the following is a full and exact
description thereof. To sustain the shafts which carry the wheels I
make a frame of wood consisting of two stout planks one of which is to stand
in the ground, or on any convenient foundation, they may be each about
five or six feet long one foot wide and four inches thick. The other to be raised
to a suitable height above it, say one foot six inches for which purpose
there are two end pieces into which the before named planks are
framed and made fast by screws, bolts or otherwise; the bottom plank
contains the steps in which the lower ends of the shafts are to run and
in the upper plank there are to be boxes to sustain their upper ends; the
wheels pinions and other parts employed may vary in their dimensions
in describing them however it will be convenient to designate certain
sizes, but still I wish it to be distinctly understood that I do not intend to
limit or confine myself to these particulars nor indeed to the exact
mode of gearing designated by me. The diameter of the main driving
wheel may be about five feet, this stands on the upper side of the frame
immediately over or rather upon the vertical shaft of which there are
two: the upper end of this first shaft passes through the top plank and
there is a hole in the lower side of the driving wheel at its center
[illegible] which fits on the end of the shaft; to the upper side of this
driving wheel the lever or sweep to which the horse is geared, is to

8146X be fastened by any suitable contrivance The driving wheel gears
a pinion on the upper end of the second shaft, which pinion may b
about eight inches in diameter. Upon this second shaft there is
be a second driving wheel which may be of the same diamete
with the first in which case it will mash into a pinion on t
first named shaft of the same size with that on the second sha
Upon the first shaft below the pinion there is a bevel wheel whi
may be of the same size with the driving wheel, this gears in
a bevel pinion upon a horizontal shaft running in suitable bea
below it, This pinion may be of the size of the other pinions but m
vary according to the speed with which it is required that the
horizontal shaft shall revolve. The outer end of the horizontal may
carry a whirl to receive a strap or band or be connected with an
other convenient way with the machinery to be driven. All the
wheels and pinions may be of cast iron and the shafts of cast
wrought iron. For the purpose of perfect adjustment so that the teeth may
be made to mash into each other correctly and that the degree
in which they do so may be regulated. I adapt regulating key
or wedges to the step boxes of the shafts and also to the boxes in the
upper plank in which the upper ends of the shafts run, For the pu
of adjusting the step boxes a mortice is made through the lower
plank from side to side immediately under each shaft and into
these a wedge shaped key is fitted by driving this key one way or
other the step which rests upon it is raised or lowered. The upper e
of the shafts run in divided boxes to each of which there is a key
fitted in like manner. Mortices running through the upper timber
and by means of these the shafts may be moved nearer together o
further apart, and the mash of the teeth nicely adjusted.

The divided boxes in which the first shaft runs, rise above t
upper plank so as to form a bearing upon which the hub of the m
driving wheel rests, and by this means it is prevented from pressi
upon the shaft or wheel below. If desired the first driving wheel a
pinion in which it gears, may be below the plate, suitable arrange

8746X being made to attach the Straps or [illegible] to a neck or Collar [illegible]
up through the plate, or I make the upper plank in two pieces joined tog[ether]
so as to meet in the Center of the Shaft as by this means the Shaft
may be removed without the necessity of disturbing the wheels and
pinions fixed upon them. The two halves of the plank are to be secured
together by screw bolts.

What I claim as my invention is the general mode or
plan for adjusting the Shaft and gearing in a portable horse
power by wedges or keys operating as herein before set forth.
I also Claim the adapting of the box in which the first Shaft runs
to the supporting of the weight of the first driving wheel, as above
described.

John Brandon

Witnesses
[illegible] Clark
C. Pilley ([illegible]) [illegible] Rec.d & Recorded anew June 2. 1837. —